June 2, 1942. A. Y. DODGE 2,285,257
BRAKE
Original Filed June 29, 1932
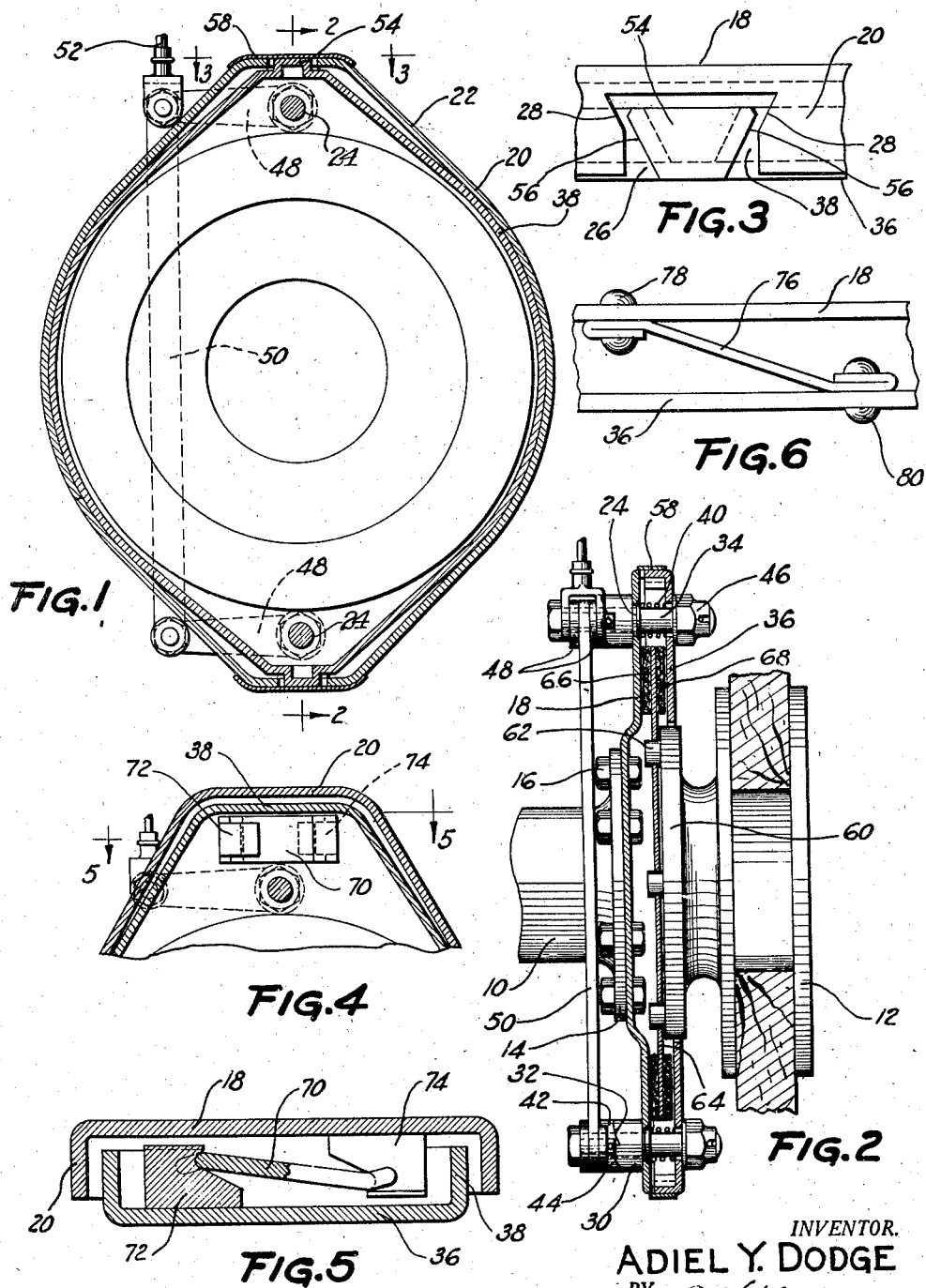
INVENTOR.
ADIEL Y. DODGE
BY
ATTORNEY

UNITED STATES PATENT OFFICE 2,285,257

BRAKE

Adiel Y. Dodge, South Bend, Ind., assignor to Bendix Aviation Corporation, South Bend, Ind., a corporation of Delaware Application June 29, 1932, Serial No. 620,017
Renewed February 1, 1938

17 Claims. (Cl. 188—72)

This invention relates to brakes and more particularly to disc brakes.

The invention broadly comprehends a disc brake including a fixed disc, an axially movable disc having slight rotation, a rotatable and axially movable friction element for cooperation with discs, means for engaging the friction element with the discs, and servo means for increasing the braking effect.

An object of the invention is to provide a disc brake having servo action.

Another object of the invention is to provide a disc brake including a fixed disc having a peripheral flange, an axially movable and slightly rotatable disc having a peripheral flange telescoping the flange on the fixed disc and a rotatable and axially movable friction element positioned between the discs, means for moving one of the discs toward the other to engage the friction element, and members connecting the discs operable upon actuation of the brake to impart a servo action to the brake.

Other objects of the invention will appear from the following description taken in connection with the drawing which forms a part of this specification, and in which:

Figure 1 is a vertical sectional view of a brake mechanism illustrating the invention as applied;

Figure 2 is a sectional view substantially on line 2—2, Figure 1;

Figure 3 is a sectional view substantially on line 3—3, Figure 1;

Figure 4 is a fragmentary view illustrating a modified form of the invention;

Figure 5 is a sectional view substantially on line 5—5, Figure 4; and

Figure 6 illustrates a further modification of the invention.

Referring to the drawing for more specific details of the invention, 10 represents an axle housing. The housing has positioned therein an axle, not shown, on which is mounted for rotation a wheel 12. As shown, the axle housing 10 has a circumferential flange 14 to which is suitably secured as by bolts 16 a disc 18 having a perimetral flange 20. This flange is of relatively shallow depth and extends substantially at right angles to the body of the disc.

As shown, the disc 18 is provided with diametrally disposed extended portions 22 apertured as at 24 and the flanges on the extended portions are provided with slots 26, the opposite walls of the slots being beveled as indicated at 28, the object of which will hereinafter appear. Positioned in the apertures 24 are sleeves 30 having cam faces 32 and positioned for reciprocation in the sleeves are studs 34.

The studs 34 support for axial movement a disc 36 having a perimetral flange 38 telescoping the perimetral flange 20 on the disc 18, and positioned on the studs 34 between the disc 18 and the disc 36 are springs 40 tending to force the discs apart. The studs 34 have positioned thereon for rotation sleeves 42 provided with cam faces 44 engaging the cam faces 32 on the sleeves 30, the sleeves 42 being retained or secured against displacement by nuts 46 threaded on the studs 34. The sleeves 42 have rock arms 48 connected as by a link 50 and one of the rock arms 48 has secured thereto an operating cable 52.

The disc 36 has formed on its perimetral flange a lug 54 provided with oppositely disposed beveled faces 56 adaptable for cooperation with the beveled walls 28 of the slot 26 in the flange 20 on the disc 18, and positioned on the flange 20 of the disc 18 over the slot 26 is a dust shield 58.

The hub of the wheel 12 has a flange 60 on which is positioned spaced pins 62. These pins support an axially movable and rotatable friction element or disc 64 having frictional faces 66 and 68 adaptable for engagement with the discs 18 and 36. The friction disc 64 is free to move axially on the pins 62 and is rotated through the pins.

A modification of the invention is illustrated in Figures 4 and 5 wherein servo action between the fixed and axially movable discs is effected by means of a compression member 70 arranged between a stop 72 on the fixed disc and a stop 74 on the axially movable disc. A further modification is illustrated in Figure 6. In this modification a servo element including a tension member 76 has one of its ends suitably secured as by a rivet 78 to the fixed disc and its other end secured as by a rivet 80 to the axially movable disc.

In operation, force is applied through operating or drag cable 52 to rock the arms 48. This movement rotates the sleeves 42 causing the cam faces 44 on the sleeves 42 to ride on the cam faces 32 on the sleeves 30. This causes the studs 34 to reciprocate in the sleeves 30 and to move the disc 36 axially towards the disc 18 to engage the friction faces 66 and 68 on the friction element 64. Upon actuation of the brake to engage the friction element with the disc movement is augmented by the servo action imparted to the brake by reason of the inclined surfaces 56 engaging the beveled walls 28 on the fixed disc.

In some instances, it may be found desirable to provide other means for effecting servo action of the brake than by that shown in the preferred form of the invention, and to that end compression or tension members connecting the fixed disc with the axially movable and slightly rotatable disc may be employed. In either instance, upon applying the brake through the operating cams to engage the discs with the rotatable and axially movable friction element, the compression or tension members will lend servo action to the disc causing the discs to more effectively engage the friction element. In either instance, servo action may be attained with equally good results.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A disc brake comprising a fixed member, an axially movable and slightly rotatable member, a friction element between the members, means for actuating the axially movable member to engage the friction element with the members, and a link connecting the members tending to force the members together upon engagement with the friction element, actuating means being independent of said link.

2. A disc brake comprising a fixed member, an axially movable and slightly rotatable member, a rotatable and axially movable friction element between the members, means for actuating the axially movable member to engage the friction element with the members, and a link acting in compression between the members tending to force the members together upon engagement of the members with the friction element.

3. A disc brake comprising a fixed member, an axially movable and slightly rotatable member, a friction element between the members, means for actuating the axially movable member to engage the friction element with the members, and a tension link connecting the members adapted to force the members together upon engagement of the members with the friction element, said actuating means being adapted to actuate the axially movable member independently of said link.

4. A brake including a member for attachment to a member to be retarded in its rotation, a laterally movable rotative disk having operative connection with said member to turn therewith, a fixed drum to be frictionally contacted by said rotative disk when said disk is moved laterally, a friction disk connected to said drum by means comprising a peripheral projection on said disk to engage within the angle between divergent surfaces on said drum extending angularly to the plane of rotation of said rotatable disk, said disk having limited rotative movement relative to said drum, and means for effecting an initial frictional contact between said disks, said limited rotation of said disk relative to said drum being effected by said initial frictional contact of said disks to move said disks into further frictional contact.

5. A brake including a drum for attachment to and rotatable with a member to be retarded in its rotation, a friction disk mounted upon and operatively connected to said drum to turn therewith and free to move laterally, a fixed drum opposed to one side of said disk, a retarding friction disk opposed to the other side of said laterally movable disk and connected to and having limited rotation relative to said fixed drum, and manually operable means for moving said disks laterally into initial frictional contact with each other and with said drum, said connection between said fixed drum and retarding disk comprising a projecting portion on one of said members to engage within the angle between divergent surfaces on the other of said members, which surfaces are inclined to the plane of rotation of said first named friction disk to move said retarding disk into further frictional contact with said rotative disk upon said limited rotation of said disk relative to said fixed drum by its initial contact with said rotative disk.

6. A brake including a friction disk to rotate with a member to be retarded in its rotation, a fixed drum having a slot therein longitudinally thereof, a friction disk to engage said rotatable disk and having means to engage said slot, and means for moving said disks into initial frictional contact, said slot being formed to permit a limited rotative movement of said disk relative to said drum and to move said disk into further frictional contact with said rotatable disk upon such limited rotation caused by said initial contact between said disks.

7. A friction brake including a friction disk for connection with a member to be retarded in its rotation to rotate therewith, a non-rotative member formed with divergent surfaces oppositely inclined and to the plane of rotation of said rotatable disk, a second friction disk having a limited rotative movement and arranged to contact with either of said inclined surfaces, and means for effecting initial contact between said disks, limited rotation in either direction of said second disk in contact with either of said inclined surfaces of said non-rotative member being effective to move said disks into further frictional engagement.

8. A brake including a friction disk for connection with a member to be retarded in its rotation to rotate therewith, a non-rotatable drum having an opening therein formed with a side inclined in the direction of rotation of said rotatable disk, a second friction disk formed with a lug to engage within said opening and contact said inclined side to effect contact between said disks upon limited rotation of said second disk, and means for moving said disks relatively to effect initial frictional contact therebetween.

9. A brake including a friction disk for connection with a member to be retarded in its rotation to rotate therewith, a non-rotatable drum formed with a longitudinal slot having a straight side portion and a side portion inclined in the direction of rotation of said rotatable disk, a second disk having a peripheral lug to engage said slot, means for effecting initial contact between said disks, and means for moving said second disk away from said rotatable disk to move said lug along said slot out of contact with said inclined portion thereof into contact with said straight portion.

10. A brake including a friction member for connection with a member to be retarded in its rotation, to rotate therewith; a non-rotatable member provided with surfaces, one inclined in one direction to the plane of rotation of said rotatable member and another inclined in an opposite direction; a retarding friction member to engage and retard said rotatable friction member in its rotation and having limited rotative movement relative to said non-rotative member and arranged to engage one of said inclined surfaces when rotated in one direction relative to said fixed member, and to engage another of said surfaces when rotated in an opposite direction; and means for rotating said retarding friction member to bring it into initial engagement with one of said inclined surfaces; whereby further frictional engagement between said friction members in either direction of rotation, is aided by relative rotation of said members caused by initial engagement.

11. A brake including a friction member for connection with a member to be retarded in its rotation, to rotate therewith; a non-rotatable member provided with surfaces, one inclined in one direction to the plane of rotation of said rotatable member and another inclined in an opposite direction; a retarding friction member to engage and retard said rotatable friction member in its rotation and having limited rotative and lateral movement relative to said non-rotative member; means on said retarding member to engage one of said inclined surfaces in either direction of rotation of said member; means for yieldingly holding said retarding member moved laterally with said means thereon at the adjacent ends of said diverging surfaces; and means for moving said retarding member into initial frictional engagement with said rotatable friction member and with said means engaged with one of said inclined surfaces, whereby further frictional engagement between said members is aided in either direction of rotation by relative rotation of said members.

12. The combination of power transmission elements adapted by engagement to transmit power from one to the other, one of said elements being slidably mounted to move bodily towards and away from the other element, and being apertured, and means actuated by power transmitted between the power transmission elements for sliding the slidably mounted power transmission element in the direction of engagement, the said means being located to limit the extent of possible movement of said slidably mounted power transmission element, and said means including an actuator extending through the aperture in said last-named element.

13. The combination of power transmission elements adapted by engagement therebetween to transmit power from one to the other, one of said elements being slidably mounted to move bodily towards and away from the other element, and means actuated by power transmitted between the power transmission elements for sliding the slidably mounted power transmission element in the direction of engagement, said slidably mounted power transmission element being apertured, and manually operable means extending through the aperture in the last-mentioned power transmission element for imparting initial movement to the slidably mounted transmission element, said combination including means for limiting movement of the slidably mounted element, and said slidably mounted transmission element being so constructed and located relative to the limiting means as to limit the extent of possible movement of said slidably mounted transmission element as aforesaid.

14. A disc brake comprising a fixed member, an axially movable and slightly rotatable member, a rotatable friction element adapted to be frictionally engaged by said axially movable member, a bearing block on each member, and a compression element bearing on each of the blocks at points lying on a line askew to the brake axis, tending to force the slightly rotatable member into engagement with the rotatable element upon engagement with the rotatable element while rotating.

15. A disc brake comprising a stationary member, a slightly rotatable and axially movable member, a rotatable friction element therebetween, applying means extending through said members and adapted to react on said members to frictionally engage said members with said element, and means for causing further frictional engagement pressure between said members and element upon relative rotation between said members.

16. A disc brake comprising a fixed disc, a slightly rotatable and axially movable disc, a rotatable element interposed between said discs, and means for initially moving said movable disc axially into engagement with said rotatable element and for thereafter moving said disc axially in response to rotation thereof caused by frictional engagement with said rotatable element, said means including an operating lever and also including a thrust link acting in compression during brake application, said link being seated at one end in a recess provided on said rotatable and axially movable disc.

17. A disc brake comprising a fixed disc, a slightly rotatable and axially movable disc, a rotatable element interposed between said discs, and means for initially moving said movable disc axially into engagement with said rotatable element and for thereafter automatically moving said disc axially in response to rotation thereof caused by frictional engagement with said rotatable element, said means including manually operated mechanism and also including a thrust link acting in compression during brake application, said link being seated at one end in a recess provided on said axially movable disc and adapted to thrust said movable disc in the direction of the rotatable element.

ADIEL Y. DODGE.